Patented Apr. 12, 1927.

1,624,674

UNITED STATES PATENT OFFICE.

ALFRED POLLAK, OF VIENNA, AUSTRIA.

PROCESS OF PRODUCING LACTIC ACID FROM SUGAR-CONTAINING RAW MATERIALS BY MEANS OF LACTIC-ACID BACTERIA.

No Drawing. Application filed September 11, 1924, Serial No. 737,197, and in Czechoslovakia September 29, 1923.

My invention relates to a process for producing lactic acid in a continuous manner from sugar-containing raw materials by bacteriological means, and particularly for the production of lactic acid and nitrogen-containing lactic acid compounds to be utilized in the manufacture of yeast.

The production of lactic acid in mashes or worts has hitherto been carried out by a discontinuous process only. For this purpose the acidulation is initiated either by means of a pure culture of lactic acid bacteria or as a rule by means of a small quantity of acidulated mash or wort kept back from the preceding day, pure culture being in such case only introduced from time to time. Thereafter the mash to be acidulated is at about 50° C. allowed to stand at rest for such time, as is required for attaining the desired degree of acidity, which time amounts from 24 to 48 hours. The mash thus acidulated is then subjected to fermentation with yeast. As is seen, the acidulation hitherto always took place in such manner, that the entire quantity of the material to be acidulated was subjected to the acidulation in a state of perfect rest up to the desired degree of acidity and this process had to be perfectly accomplished, when the yeast propagation was to be started.

The process of my invention aims to supply the nitrogen requirements of the yeast wholly or mainly by nitrogen-containing lactic acid compounds, preferably by ammonium lactate, that is to say to introduce such amounts of latic acid in the form of ammonium salts into the fermentation as correspond to the nitrogen contents of the dry substance of the finished yeast, the growing yeast consuming this entire lactic acid part for its growth almost or entirely without any loss by development of carbon dioxide. For producing the great amounts of lactic acid it is especially important that the lactic acid formation should proceed rapidly and continuously in order to save space and time and in order constantly to maintain in the production of the yeast the nitrogen concentration and acidity, which is most favorable for the yield and quality of the growing yeast.

For this purpose, according to the present invention, such a vigorous acidulation is generated by the addition of a large amount of a separately prepared sour stock to the solution to be acidulated, that an ample propagation of the ferment in all parts of this solution results, the lactic acid generated is neutralized to a greater or less extent immediately after its formation and the acidulated liquid is carried away continuously or at intervals by portions while equal amounts of a fresh solution are supplied to the acidulating vessel, thus rendering the operation continuous.

The term "sour stock" employed in the present specification is intended to denote a portion of the mash to be fermented in which a culture of lactic acid bacteria is, under suitable conditions, propagated in a similar manner, as for instance, culture yeast (starting yeast, pitching yeast) is first amply reproduced in a setting on portion (leaven).

The process may be divided into several stages by connecting together several acidulating vats, which are traversed in one direction by the solution to be acidulated at a controlled speed. While fresh mash or wort is continuously supplied to the first vessel, acid-containing solution, enriched with nitrogen by neutralizing the lactic acid formed to a greater or less extent, is continuously removed from the last vessel in accordance with the requirements of the yeast-producing process.

The neutralizing nitrogenous compounds may be introduced into the first acidulating vessel, or, if an acid concentration noxious to the lactic acid bacteria has not been reached in the first vessel, into the second acidulating vessel or into each of several vessels.

The discharged solution containing lactic acid and nitrogen-containing lactic acid compounds also carries lactic acid bacteria which can be killed by sterilization prior to the introduction of the liquid into the yeast producing process. In this case the acidulated solution after it has been sterilized, must naturally first be brought to the requisite fermentation temperature. However, it is not absolutely necessary to render the lactic acid bacteria harmless because the lactic acid subsequently produced in the yeast-producing process by the bacteria introduced into the fermentation vat with the acidulated part of the culture medium, may be neutralized by the direct addition to the fermenting liquid, of nitrogen-containing alkalis or also other alkalis as required in respect of the degree of acidity and of the nitrogen content existing during the reproduction of yeast.

*Example.*

The molasses to be acidulated is diluted to 5 to 15° Balling according to the space available. After addition of specially suitable auxiliary substances, such as malt germs, malt germ extract or other albuminous extracts or the like, the acidulation is started, preferably by adding a setting on portion (sour stock), the acidulation of which had in first instance been provoked by a powerful lactic acid ferment. The temperature is maintained between 50–56° C. After attaining a certain degree of acidity for example 1.5° (corresponding to 1.5 cc. of a normal solution of sodium hydroxyde per 100 cc.) the lactic acid is continuously neutralized, for instance, by means of ammonia. This is continued until the desired amount of ammonium lactate is present which will take place, according to the progress of the acidulation, within 12–24 hours.

Part of the acidulated liquid is removed for employment in the fermentation vat. Thereupon the acidulating vat is again filled up with the same quantity of molasses solution as has just been removed, which may amount to two-thirds of the total contents. The acidulation is continued in the same manner as before, until sufficient lactic acid has again been formed. In this manner the entire sugar contents can be practically transformed into lactic acid.

The molasses is preferably introduced in a continuous manner that is, the acidulation is allowed to commence with low sugar concentration and the sugar concentration is maintained at the same level during acidulation, by continuously introducing sugar-containing solution in an amount depending on the formation of lactic acid.

Similarly the removal of the acidulated solution may be effected in a continuous manner. For this purpose several vats, preferably three, are utilized instead of one acidulating vat. The fresh solution then flows into the first vat; this communicates with the second vat, which latter communicates with the third vat. The acidulated solution is continuously removed from the last vat. The flow is so regulated that the introduced sugar unit must remain in the vats until it has been transformed entirely, or to a desired percentage, into lactic acid.

I do not deem it necessary to give complete quantitative data for the reason, that those skilled in the art are familiar with the requirements and the literature on the subject is old and well known.

What I claim is:

1. A continuous process of producing lactic acid from sugar-containing raw materials by means of lactic acid bacteria, which consists in initiating vigorous acidulation of the sugar-containing solution to be fermented, thus provoking an ample propagation of the ferment in all parts of the said solution, whereby part of the generated lactic acid is neutralized after its formation with nitrogen-containing alkalis, and withdrawing the fermented liquid at intervals by portions and supplying equal amounts of fresh sugar-containing solution to the acidulating vessel while acidulation is permitted to continue.

2. A continuous process of producing lactic acid from sugar-containing raw materials by means of lactic acid bacteria, which consists in initiating vigorous acidulation by the addition of a separately prepared setting-on portion to the sugar-containing solution to be fermented, thus provoking an ample propagation of the ferment in all parts of the said solution, whereby part of the generated lactic acid is neutralized after its formation with nitrogen-containing alkalis, and withdrawing the fermented liquid at intervals by portions and supplying equal amounts of fresh sugar containing solution to the acidulating vessel while acidulation is permitted to continue.

3. A continuous process of producing lactic acid from sugar-containing raw materials by means of lactic acid bacteria, which consists in initiating vigorous acidulation by the addition of a separately prepared setting-on portion to the sugar containing solution to be fermented, thus provoking an ample propagation of the ferment in all parts of the said solution, whereby part of the generated lactic acid is neutralized after its formation with nitrogen-containing alkalis and withdrawing the fermented liquid continuously and supplying continuously equal amounts of fresh sugar-containing solution to the acidulating vessel while acidulation is permitted to continue.

4. A continuous process of producing lactic acid from sugar-containing raw materials by means of lactic acid bacteria, which consists in connecting together several acidulating vats, which are transversed in one direction by the sugar containing solution to be acidulated, initiating vigorous acidulation by the addition of a separately prepared setting-on portion to the solution, thus provoking an ample propagation of the ferment in all parts of said solution, whereby part of the generated lactic acid is neutralized after its formation with nitrogen-containing alkalis, and continuously removing the fermented liquid from the last vessel and applying continuously and at the same speed fresh sugar-containing material to the first one while acidulation is permitted to continue.

In testimony whereof I have affixed my signature.

ALFRED POLLAK.